United States Patent
Liang et al.

(10) Patent No.: US 9,336,374 B2
(45) Date of Patent: May 10, 2016

(54) METHOD, MODULE, AND COMPUTER PROGRAM PRODUCT FOR IDENTIFYING USER OF MOBILE DEVICE

(71) Applicant: National Central University, Jhongli, Taoyuan County (TW)

(72) Inventors: Deron Liang, Taipei (TW); Chien-Cheng Lin, Yunlin County (TW)

(73) Assignee: National Central University, Jhongli, Taoyuan County (TW)

( * ) Notice: Subject to any disclaimer, the term of this patent is extended or adjusted under 35 U.S.C. 154(b) by 14 days.

(21) Appl. No.: 14/528,822

(22) Filed: Oct. 30, 2014

(65) Prior Publication Data

US 2015/0379249 A1 Dec. 31, 2015

(30) Foreign Application Priority Data

Jun. 30, 2014 (TW) .............................. 103122478 A

(51) Int. Cl.
| | |
|---|---|
| *H04L 29/06* | (2006.01) |
| *G06F 21/32* | (2013.01) |
| *G06F 3/041* | (2006.01) |
| *G06F 3/0346* | (2013.01) |
| *G06F 21/31* | (2013.01) |
| *G06F 21/36* | (2013.01) |

(52) U.S. Cl.
CPC .............. *G06F 21/32* (2013.01); *G06F 3/0346* (2013.01); *G06F 3/0416* (2013.01); *G06F 21/316* (2013.01); *G06F 21/36* (2013.01)

(58) Field of Classification Search
CPC ....... G06F 21/32; G06F 21/316; G06F 21/36; G06F 3/0346; G06F 3/0416
USPC .......................................................... 726/19
See application file for complete search history.

(56) References Cited

U.S. PATENT DOCUMENTS

| | | | | |
|---|---|---|---|---|
| 2009/0044252 | A1* | 2/2009 | Kashima | H04L 12/581 726/3 |
| 2009/0320123 | A1* | 12/2009 | Yu | G06F 21/316 726/16 |
| 2012/0028710 | A1* | 2/2012 | Furukawa | G06F 21/32 463/37 |
| 2012/0124662 | A1* | 5/2012 | Baca | G06F 21/32 726/17 |
| 2013/0263206 | A1* | 10/2013 | Nefedov | G06F 21/6218 726/1 |
| 2014/0181926 | A1* | 6/2014 | Larmo | H04W 12/04 726/6 |
| 2015/0135309 | A1* | 5/2015 | Karmarkar | G06F 21/36 726/19 |
| 2015/0220907 | A1* | 8/2015 | Denton | G06Q 20/40 705/44 |
| 2015/0254467 | A1* | 9/2015 | Leuthardt | G06F 21/62 726/28 |

\* cited by examiner

*Primary Examiner* — Michael S McNally
(74) *Attorney, Agent, or Firm* — Ice Miller LLP

(57) ABSTRACT

A module for authenticating a user of a mobile device. The mobile device has an orientation sensor and a touch screen sensor. The module includes: a behavioral biometrics conversion element, used to perform calculation by matching timestamps with a plurality of behavioral data of operations, sensed by the orientation sensor and the touch screen sensor, on the mobile device to acquire a plurality of behavioral biometrics quantities, and convert, by using a statistical method, multiple sets of the behavioral biometrics quantities into a behavioral biometrics pattern in a histogram constructing manner; and an authentication mechanism core element, used to determine whether the behavioral biometrics pattern conforms to a behavioral biometrics model pattern in a histogram manner. The present invention further includes a method and a computer program product for authenticating a user of a smart phone.

15 Claims, 5 Drawing Sheets

METHOD, MODULE, AND COMPUTER PROGRAM PRODUCT FOR IDENTIFYING USER OF MOBILE DEVICE

CROSS-REFERENCE TO RELATED APPLICATIONS

The present application is related to and claims the priority benefit of Chinese Patent Application Serial No 103122478, filed Jun. 8, 2014, the text and drawings of which are hereby incorporated by reference in their entireties.

BACKGROUND

1. Technical Field

The present invention relates to an electronic device, and in particular, to a method, a module, and a computer program product for authenticating a user of a mobile device.

2. Related Art

As smart phones become popular and multifunctional, an increasing number of users use a smart phone in life to surf the Internet, take pictures, listen to music, watch movies, and share information. However, although the use of a smart phone may greatly improve convenience for a user in life, as an increasing quantity of data is stored in a smart phone or a remote service, corresponding data privacy needs to be ensured urgently.

At present, a commercially available protection mechanism for a smart phone is generally a pattern lock or a combination lock, an unlock pattern of such a protection mechanism is easily peeped at and learned by others; when another person obtains the smart phone and inputs the code learned from the peep, the person can use the smart phone and access local or remote data. Such a protection mechanism is easily cracked by a malicious person.

SUMMARY

In view of the foregoing problems, the present invention provides a method, a module, and a computer program product for authenticating a user of a mobile device. When a user operates a smart phone, an orientation sensor and a touch screen sensor built in the smart phone are used to collect behavioral biometrics of holding of and operations on the smart phone by the user to perform authentication, so as to form a new generation protection mechanism for a smart phone and provide stronger protection for a smart phone.

A first aspect of the present invention provides a module for authenticating a user of a mobile device, where the mobile device has an orientation sensor and a touch screen sensor, and the module includes:

a behavioral biometrics conversion element, used to perform calculation by matching timestamps with a plurality of behavioral data of operations, sensed by the orientation sensor and the touch screen sensor, on the mobile device to acquire a plurality of behavioral biometrics quantities, and convert, by using a statistical method, multiple sets of the behavioral biometrics quantities into a behavioral biometrics pattern in a histogram constructing manner; and an authentication mechanism core element, used to determine whether the behavioral biometrics pattern conforms to a behavioral biometrics model pattern in a histogram manner.

A second aspect of the present invention provides a method for authenticating a user of a mobile device, where the mobile device has an orientation sensor and a touch screen sensor, and the method includes the following steps:

sensing, by the orientation sensor and the touch screen sensor, operations on the mobile device to acquire a plurality of behavioral data;

performing, by a behavioral biometrics conversion unit, calculation by matching the behavioral data with timestamps to acquire a plurality of behavioral biometrics quantities;

converting, by the behavioral biometrics conversion unit by using a statistical method, multiple sets of the behavioral biometrics quantities into a behavioral biometrics pattern in a histogram constructing manner; and determining, by an authentication mechanism core element, whether the behavioral biometrics pattern conforms to a behavioral biometrics model pattern in a histogram manner.

A third aspect of the present invention provides a computer program product storing a program, where after the program is loaded and executed by a mobile device or a computer, the method in the second aspect of the present invention is accomplished.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

To allow persons of ordinary skill in the art to which the present invention belongs to further understand the present invention, content and efficacy to achieve of the present invention are described in detail below by using preferred embodiments of the present invention with reference to accompanying drawings.

Figure 1:
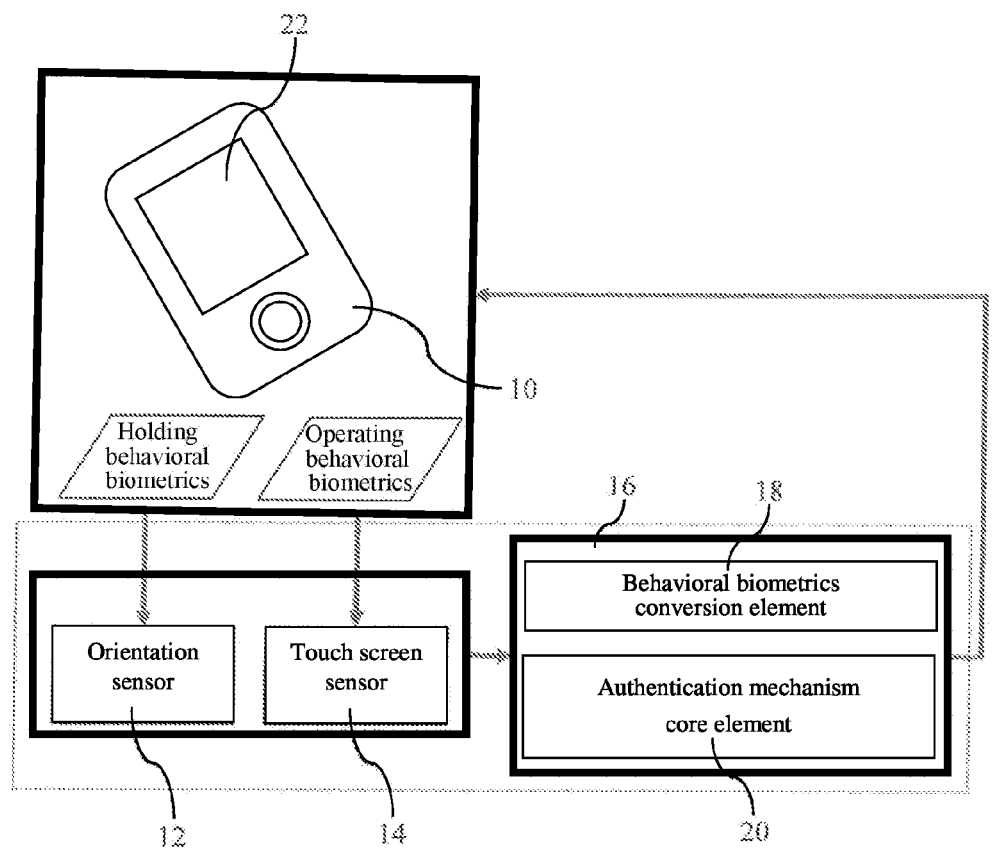
FIG. 1 is a block diagram of operations for authenticating a user of a smart phone according to the present invention.

FIG. 1 is a block diagram of operations for authenticating a user of a smart phone according to the present invention. In FIG. 1, a smart phone 10 used as a mobile device includes an orientation sensor 12, a touch screen sensor 14, and a touch screen 22, and an authentication module 16 used for authenticating a user of the smart phone 10 includes a behavioral biometrics conversion element 18 and an authentication mechanism core element 20.

If an operation mechanism and a module for authenticating a user of a smart phone of the present invention are embedded in an app (such as a Facebook app and a Gmail app), when a user uses the app, the smart phone 10 may sense all behavioral information about holding of and operations on the mobile phone, where the holding and operations are executed for the app, so as to protect the app from being opened or operated by people other than a holder of the smart phone. If the operation mechanism and the module for authenticating a user of a smart phone are embedded in an operating system, the smart phone 10 may sense all behavioral information about holding and operations in the mobile phone, so as to protect a designated app or an entire system from being opened or operated by people other than the holder of the smart phone.

The authentication module 16 is built in an operating system or an application (app) of the smart phone 10, or is built in a server (not shown). When the authentication module 16 is built in a server, several magnetic-axis azimuth angles, pitch angles, left-right roll angles, and timestamps sensed by the orientation sensor 12 as well as several screen touch positions, screen touch areas, force values, and timestamps sensed by the touch screen sensor 14 are transferred to the behavioral biometrics conversion element 18 through a network, and a result of classification and determination by the authentication mechanism core element 20 is transferred to the smart phone 10 through the network.

The touch screen 22 may display various pages (pages such as information browsing or functional operations), a processor (not shown) of the smart phone 10 transfers information on a page to be displayed to the touch screen 22, and the touch screen 22 displays the page. A user may perform operations of inputting information or sliding a page and the like on the touch screen 22, and the touch screen 22 transfers input information or an operation signal to the processor.

Figure 2A:
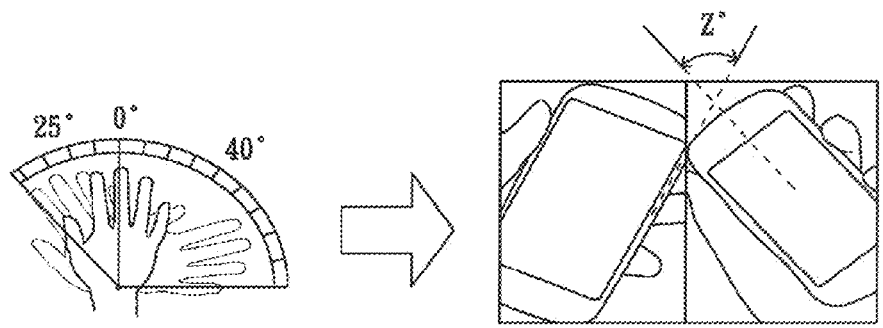
FIG. 2A is a schematic diagram of sensing a magnetic-axis azimuth angle of a smart phone according to the present invention.
Figure 2B:
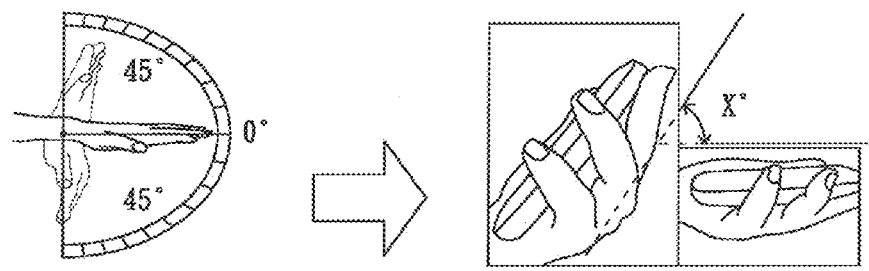
FIG. 2B is a schematic diagram of sensing a pitch angle of a smart phone according to the present invention.
Figure 2C:
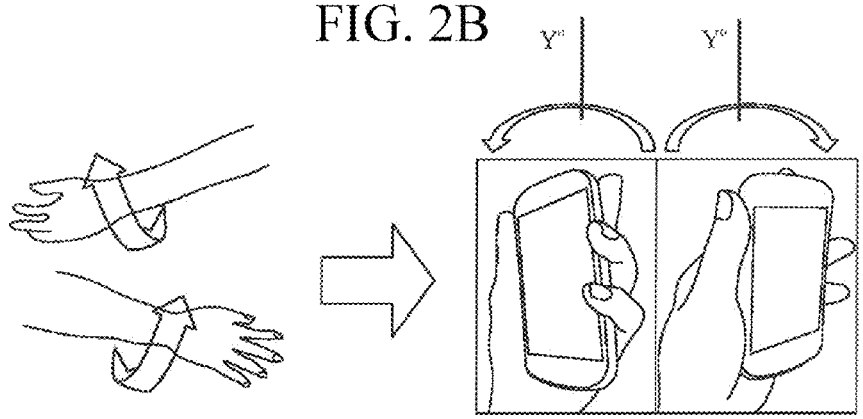
FIG. 2C is a schematic diagram of sensing a left-right roll angle of a smart phone according to the present invention.

As shown in FIG. 2A, FIG. 2B, and FIG. 2C, FIG. 2A is a schematic diagram of sensing a magnetic-axis azimuth angle of a smart phone according to the present invention, FIG. 2B is a schematic diagram of sensing a pitch angle of a smart phone according to the present invention, and FIG. 2C is a schematic diagram of sensing a left-right roll angle of a smart phone according to the present invention. When a user is operating the smart phone 10, in one operation action of the user, the orientation sensor 12 senses numerical values such as a magnetic-axis azimuth angle, a pitch angle, a left-right roll angle, and a timestamp of the smart phone 10. The orientation sensor 12 transfers the numerical values sensed to the behavioral biometrics conversion element 18. Each set of numerical values, for example, a set of a magnetic-axis azimuth angle, a pitch angle, a left-right roll angle of the smart phone 10 corresponds to a timestamp, and the timestamp is the system time of the smart phone 10.

Figures 3A, 3B:
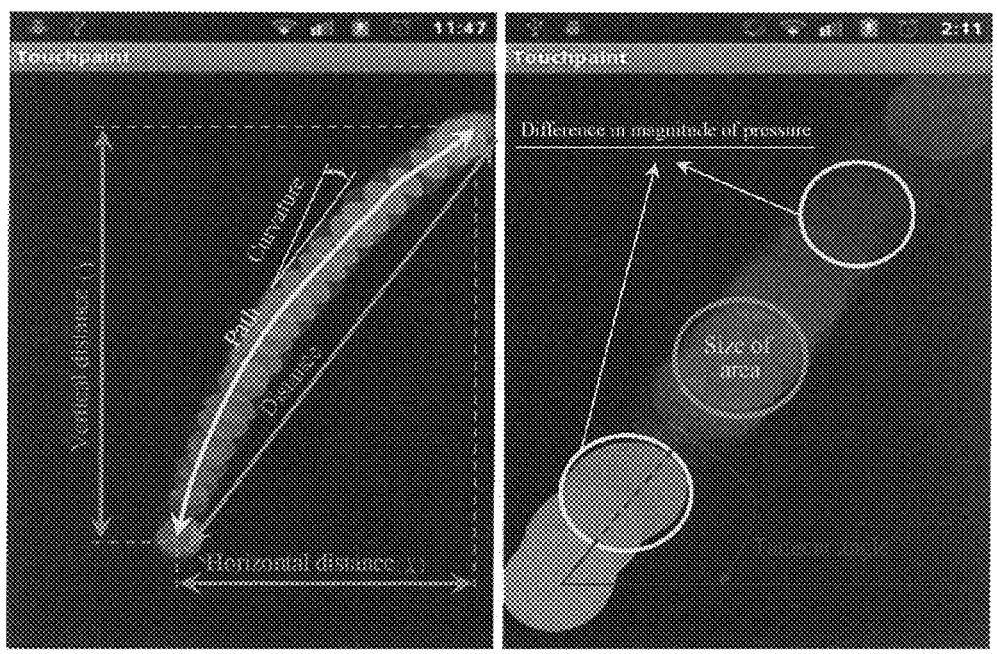
FIGS. 3A and 3B are schematic diagrams of sliding trajectories on a touch screen according to the present invention.

FIG. 3A and FIG. 3B are schematic diagrams of sliding trajectories on a touch screen according to the present invention. When a user performs an operation by sliding on the touch screen 22 (as shown in FIG. 1), the touch screen sensor 14 senses numerical values such as several screen touch positions (X-axis positions and of Y-axis positions), several screen touch areas (sizes of areas), several force values (magnitudes of pressures), and timestamps, as shown in FIG. 3A and FIG. 3B. The touch screen sensor 14 transfers the sensed numerical values to the behavioral biometrics conversion element 18. Each set of a screen touch position, a screen touch area, and a force value corresponds to a timestamp, and the timestamp is the system time of the smart phone 10.

In this embodiment, the behavioral biometrics conversion element 18 performs calculation on the numerical values such as a magnetic-axis azimuth angle, a pitch angle, a left-right roll angle, and a timestamp sensed by the orientation sensor 12 to convert the numerical values into 33 behavioral biometrics quantities of the user. The touch screen sensor 14 senses numerical values such as several screen touch positions, screen touch areas, force values, and timestamps, and the behavioral biometrics conversion element 18 performs calculation to convert the numerical values into 16 behavioral biometrics quantities of the user. However, the number of the behavioral biometrics quantities converted in this embodiment is not used to limit the present invention, and the number of the behavioral biometrics quantities may be determined according to a design of an application.

Holding behavioral biometrics, sensed by the orientation sensor 12, of the user, is a range of a variation of an absolute angle or a relative angle, a range of a variation of an average value, and a range of a variation of a standard deviation, that are separately based on a variation of an angle, a variation of an angular velocity, and a variation of an angular acceleration and are obtained by the behavioral biometrics conversion element 18 through calculation on numerical values of three axes (that is, a magnetic-axis azimuth angle, a pitch angle, and a left-right roll angle) of the smart phone 10, and biometric quantization and conversion of a histogram are performed on the behavioral biometrics quantities, obtained through the calculation, of the user. After the conversion, the number of the behavioral biometrics quantities, of the numerical values of the three axes of the smart phone 10, sensed by the orientation sensor 12, is 33.

A habitual posture 1 (behavioral biometrics quantities of an operation habit) of holding the smart phone 10:

a distribution proportion range of variations of angles:

1. a pitch angle $\Theta_p$ when the smart phone 10 is rolled in a front-rear direction,
2. a left-right roll angle $\Theta_r$ of the smart phone 10, and
3. a compound angle $\Theta_h$ of a front-rear roll angle and a left-right roll angle of the smart phone 10;

a distribution proportion range of variations of angular velocities:

1. an angular velocity $V_p$ of a pitch angle when the smart phone 10 is rolled in a front-rear direction,
2. an angular velocity $V_r$ of a left-right roll inclination of the smart phone 10,
3. an angular velocity $V_h$ of a compound angle of a front-rear roll angle and a left-right roll angle of the smart phone 10, and
4. an angular velocity $V_y$ of an magnetic-axis azimuth angle of the smart phone 10; and a distribution proportion range of variations of angular accelerations:

1. an angular acceleration $a_p$ of a pitch angle when the smart phone 10 is rolled in a front-rear direction,
2. an angular acceleration $a_r$ of a left-right roll inclination of the smart phone 10,
3. an angular acceleration $a_h$ of a compound angle of a front-rear roll angle and a left-right roll angle of the smart phone 10, and
4. an angular acceleration $a_y$ of a magnetic-axis azimuth angle of the smart phone 10.

A habitual posture 2 (behavioral biometrics quantities associated with average values) of holding the smart phone 10:

a distribution proportion range of average values of variations of angles:

1. a pitch angle $\Theta_p$ when the smart phone 10 is rolled in a front-rear direction,
2. a left-right roll angle $\Theta_r$ of the smart phone 10, and
3. a compound angle $\Theta_h$ of a front-rear roll angle and a left-right roll angle of the smart phone 10;

a distribution proportion range of average values of variations of angular velocities:

1. an angular velocity $V_p$ of a pitch angle when the smart phone 10 is rolled in a front-rear direction,
2. an angular velocity $V_r$ of a left-right roll inclination of the smart phone 10,
3. an angular velocity $V_h$ of a compound angle of a front-rear roll angle and a left-right roll angle of the smart phone 10, and
4. an angular velocity $V_y$ of an magnetic-axis azimuth angle of the smart phone 10; and a distribution proportion range of average values of the variations of the angular accelerations of angles:

1. an angular acceleration $a_p$ of a pitch angle when the smart phone 10 is rolled in a front-rear direction,
2. an angular acceleration $a_r$ of a left-right roll inclination of the smart phone 10,
3. an angular acceleration $a_h$ of a compound angle of a front-rear roll angle and a left-right roll angle of the smart phone 10, and
4. an angular acceleration $a_y$ of a magnetic-axis azimuth angle of the smart phone 10.

A habitual stability (behavioral biometrics quantities associated with standard deviations) of holding the smart phone 10:

a distribution proportion range of standard deviations of variations of angles:

1. a pitch angle $\Theta_p$ when the smart phone 10 is rolled in a front-rear direction,
2. a left-right roll angle $\Theta_r$ of the smart phone 10, and
3. a compound angle $\Theta_h$ of a front-rear roll angle and a left-right roll angle of the smart phone 10;

a distribution proportion range of standard deviations of variations of angular velocities:

1. an angular velocity $V_p$ of a pitch angle when the smart phone 10 is rolled in a front-rear direction,
2. an angular velocity $V_r$ of a left-right roll inclination of the smart phone 10,
3. an angular velocity $V_h$ of a compound angle of a front-rear roll angle and a left-right roll angle of the smart phone 10, and
4. an angular velocity $V_y$ of an magnetic-axis azimuth angle of the smart phone 10; and a distribution proportion range of standard deviations of the variations of angular accelerations of angles:

1. an angular acceleration $a_p$ of a pitch angle when the smart phone 10 is rolled in a front-rear direction,
2. an angular acceleration $a_r$ of a left-right roll inclination of the smart phone 10,
3. an angular acceleration $a_h$ of a compound angle of a front-rear roll angle and a left-right roll angle of the smart phone 10, and
4. an angular acceleration $a_y$ of the magnetic-axis azimuth angle of the smart phone 10.

Definitions and calculation formulas of behavioral biometrics quantities based on three axes of the smart phone 10 are as follows:

A compound angle of a front-rear roll angle and a left-right roll angle of the smart phone is: $\Theta_h = \sqrt{\Theta_p^2 + \Theta_r^2}$, a calculation formula of an angular velocity: $v_\theta = (\Theta_k - \Theta_{k-1})/(t_k - t_{k-1})$, where $v_\theta$ is a variation $V_p$, $V_r$, $V_h$ or $V_y$ of an angle, $\Theta$ is a variation $\Theta_p$, $\Theta_r$, and $\Theta_h$ of an angle, and t is a timestamp;

a calculation formula of an angular acceleration is: $a_\theta = (v_k - v_{k-1})/(t_k - t_{k-1})$, where $a_\theta$ is a variation $a_p$, $a_r$, $a_h$ or $a_y$ of an angle, and v is a variation $V_p$, $V_r$, $V_h$ or $V_y$ of an angle;

a calculation formula of an average value:
an angle:

$$\Theta_{avg} = \frac{1}{n}\sum_{n=1}^{n}\Theta_i,$$

where $\Theta_i$ is a variation $\Theta_p$, $\Theta_r$ or $\Theta_h$ of an angle,
an angular velocity:

$$v_{\theta_{avg}} = \frac{1}{N}\sum_{i=1}^{n}v_{\theta_i},$$

where $v_{\theta_i}$ is a variation $V_p$, $V_r$, $V_h$ or $V_y$ of an angle, and
an angular acceleration:

$$a_{\theta_{avg}} = \frac{1}{n}\sum_{i=1}^{n}a_{\theta_i},$$

where $a_{\theta_{avg}}$ is a variation $a_p$, $a_r$, $a_h$ or $a_y$ of an angle;
a calculation formula of a standard deviation:
an angle:

$$\Theta_{std} = \sqrt{\frac{1}{n-1}\sum_{i=1}^{n}(\Theta_i - \Theta_{avg})^2},$$

an angular velocity:

$$v_{\theta_{std}} = \sqrt{\frac{1}{n-1}\sum_{i=1}^{n}(v_{\theta_i} - v_{\theta_{avg}})^2},$$

and
an angular acceleration:

$$a_{\theta_{std}} = \sqrt{\frac{1}{n-1}\sum_{i=1}^{n}(a_{\theta_i} - a_{\theta_{avg}})^2}.$$

When a user operates the smart phone 10, the touch screen sensor 14 can sense a position touched by the user on a two-dimensional plane of the touch screen 22, and an area and the magnitude of a force (a pressure) of the touch on the touch screen 22. Therefore, the behavioral biometrics of the operation by the user on the smart phone 10 may be classified into three types according to features: a touch trajectory, an action (velocity and acceleration) of a touch trajectory, and a specific characteristic (a touch area and a pressure) of the touch on the touch screen 22, and altogether there are 16 behavioral biometrics quantities calculated and converted by the behavioral biometrics conversion element 18 based on the numerical values sensed by the touch screen sensor 14.

Definitions and calculation formulas of the behavioral biometrics based on the numerical values such as several screen touch positions, screen touch areas, force values, and timestamps sensed by the touch screen sensor 14 are as follows:

1. a start position $X_{start}$ of an X-axis absolute coordinate of an operating trajectory of the smart phone 10,
2. a start position $Y_{start}$ of a Y-axis absolute coordinate of an operating trajectory of the smart phone 10,
3. an end position $X_{end}$ of an X-axis absolute coordinate of an operating trajectory of the smart phone 10,
4. an end position $Y_{end}$ of a Y-axis absolute coordinate of an operating trajectory of the smart phone 10,
5. a position labeled and quantized through picture segmentation on an operating trajectory on the smart phone 10, 6. a distance D of an operating trajectory of the smart phone 10 a straight line distance between a start coordinate ($X_{start}$, $Y_{start}$) and an end coordinate ($X_{end}$, $Y_{end}$):

$$D=\sqrt{(X_{end}-X_{start})^2+(Y_{end}-Y_{start})^2},$$

7. a horizontal distance $P_h$ of an operating trajectory of the smart phone 10 a straight line distance between positions of the two X-axes of the start coordinate ($X_{start}$, $Y_{start}$) and the end coordinate ($X_{end}$, $Y_{end}$): $D_h = X_{end} - X_{start}$, 8. a vertical distance $D_v$ of an operating trajectory of the smart phone 10 a straight line distance between positions of two Y-axes of a start coordinate ($X_{start}$, $Y_{start}$) and an end coordinate ($X_{end}$, $Y_{end}$) $D_v = Y_{end} - Y_{start}$, 9. a path length Path of an operating trajectory of the smart phone 10, using a sample as a reference, a path distance between a start coordinate ($X_{start}$, $Y_{start}$) and an end coordinate ($X_{end}$, $Y_{end}$):

$$Path=\Sum_{k=1}^n \sqrt{(X_k-X_{k-1})^2+(Y_k-Y_{k-1})^2},$$

10. a tangential angle $\theta_k$ of an operating trajectory of the smart phone 10, using a sample as a reference, a vertical distance $D_{v\_k}=Y_k-Y_{k-1}$;
a horizontal distance $D_{h\_k}=X_k-X_{k-1}$; and $$\theta_k=\tan^{-1}(D_{v\_k}/D_{h\_k}),$$

11. a curvature Ck of an operating trajectory of the smart phone 10, using a sample as a reference, a vertical distance $D_{v\_k}=Y_k-Y_{k-1}$;
a horizontal distance $D_{h\_k}=X_k-X_{k-1}$;

$\theta_k=\tan^{-1}(D_{v\_k}/D_{h\_k})$, and $$C_k=\theta_k/\sqrt{D_{v\_k}^2+D_{h\_k}^2},$$

12. a timestamp t (ms) of an operating trajectory of the smart phone 10 is a period of time of each slide on the touch screen 22, 13. a variation $v_k$ of a velocity of an operating trajectory of a smart phone 10, using a sample as a reference, $v_k=Path_k/t_k$, 14. a variation $a_k$ of an acceleration of an operating trajectory of the smart phone 10, using a sample as a reference, $$a_k = \frac{v_k - v_{k-1}}{t_k - t_{k-1}},$$

15. a variation of a screen touch area of a screen operating trajectory of the smart phone 10, a standardized setting value (0-1) when a smart phone is delivered from a factory is directly used, and 16. a variation of a force value (the magnitude of a pressure) on the screen operating trajectory of the smart phone 10, a standardized setting value (0-1) when a smart phone is delivered from a factory is directly used.

When a user slides once on the touch screen 22, the smart phone 10 generates a set of numerical values such as several magnetic-axis azimuth angles, pitch angles, left-right roll angles, and timestamps sensed by the orientation sensor 12 as well as several screen touch positions, screen touch areas, force values, and timestamps sensed by the touch sensor 14. After the orientation sensor 12 and the touch screen sensor 14 transfer a set of the numerical values to the behavioral biometrics conversion element 18, the behavioral biometrics conversion element 18 performs calculation on the set of numerical values and converts the set of values into a set of 33 behavioral biometrics quantities of the holding behavioral biometrics and 16 behavioral biometrics quantities of the operating behavioral biometrics. The user slides on the touch screen multiple times and the foregoing sensing, calculation, and conversion are performed, so that the behavioral biometrics conversion element 18 generates multiple sets of the foregoing 33 behavioral biometrics quantities of the holding behavioral biometrics and 16 behavioral biometrics quantities of the operating behavioral biometrics.

Figure 4:
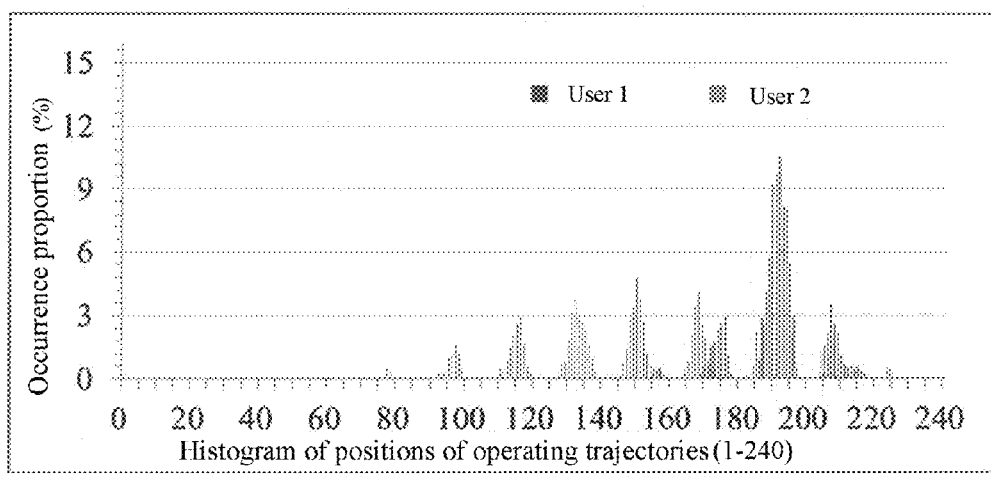
FIG. 4 is a histogram of relationships between positions and occurrence proportions of operating trajectories according to the present invention.

After generating multiple sets of the 33 behavioral biometrics quantities of the holding behavioral biometrics and 16 behavioral biometrics quantities of the operating behavioral biometrics, the behavioral biometrics conversion element 18 statistically constructs the multiple sets of the 33 behavioral biometrics quantities of the holding behavioral biometrics and 16 behavioral biometrics quantities of the operating behavioral biometrics into several behavioral biometrics patterns in a histogram constructing manner. A histogram of relationships between positions and occurrence proportions of operating trajectories in the present invention in FIG. 4 is used as an example. For a user 1, a high occurrence proportion of positions of an operating trajectory in the 33 behavioral biometrics quantities is mainly between 170 and 220; for a user 2, a high occurrence proportion of positions of an operating trajectory in the 33 behavioral biometrics quantities of a user 2 is mainly between 90 and 180, so that it can be found that different users have different habits in operating the smart phone 10.

The behavioral biometrics conversion element 18 intends to establish a behavioral biometrics model pattern (similar to the pattern on the histogram in FIG. 4) corresponding to a user of the smart phone 10, so that more sets of 33 behavioral biometrics quantities of the holding behavioral biometrics and 16 behavioral biometrics quantities of the operating behavioral biometrics are needed to statistically construct several behavioral biometrics model patterns on a histogram. If a behavioral biometrics model pattern is established from more sets of 33 behavioral biometrics quantities of the holding behavioral biometrics and 16 behavioral biometrics quantities of the operating behavioral biometrics, a result generated by the authentication mechanism core element 20 through classification and determination performed on the behavioral biometrics model pattern and the behavioral biometrics pattern is more accurate.

The authentication mechanism core element 20 uses a classifier algorithm to perform classification and determination on the behavioral biometrics model pattern and the behavioral biometrics pattern. If the behavioral biometrics model pattern conforms to the behavioral biometrics pattern, the result of the determination is true, which represents that an operation and action behavior of a user on the smart phone 10 conforms to a behavioral biometrics model established in advance, that is, the user who operates the smart phone 10 is the holder of the smart phone 10; otherwise, the result of the classification and determination is false.

The authentication mechanism core element 20 may perform the construction by using an existing common classifier algorithm, which is not specifically limited, for example, a weighted k-nearest-neighbor (W-KNN) algorithm, a support vector machine (SVM) algorithm, an artificial neural network (Multi-Layer Perceptron, MLP) algorithm, a Bayes algorithm, a decision tree algorithm, among other algorithms.

The authentication mechanism core element 20 is trained by using the behavioral biometrics model pattern, of a corresponding holder of the smart phone 10, established by the behavioral biometrics conversion element 18. To improve the accuracy of classification and determination of the behavioral biometrics model pattern and the behavioral biometrics pattern, behavioral biometrics model patterns of one or more persons other than the holder of the smart phone 10 may be added to the authentication mechanism core element 20 to be tested, so that the accuracy of the classification and determination of the behavioral biometrics model pattern and the behavioral biometrics pattern by the authentication mechanism core element 20 can be improved. The behavioral biometrics model patterns of persons other than the holder of the smart phone 10 may be provided by a system supplier or a programmer.

Figure 5:
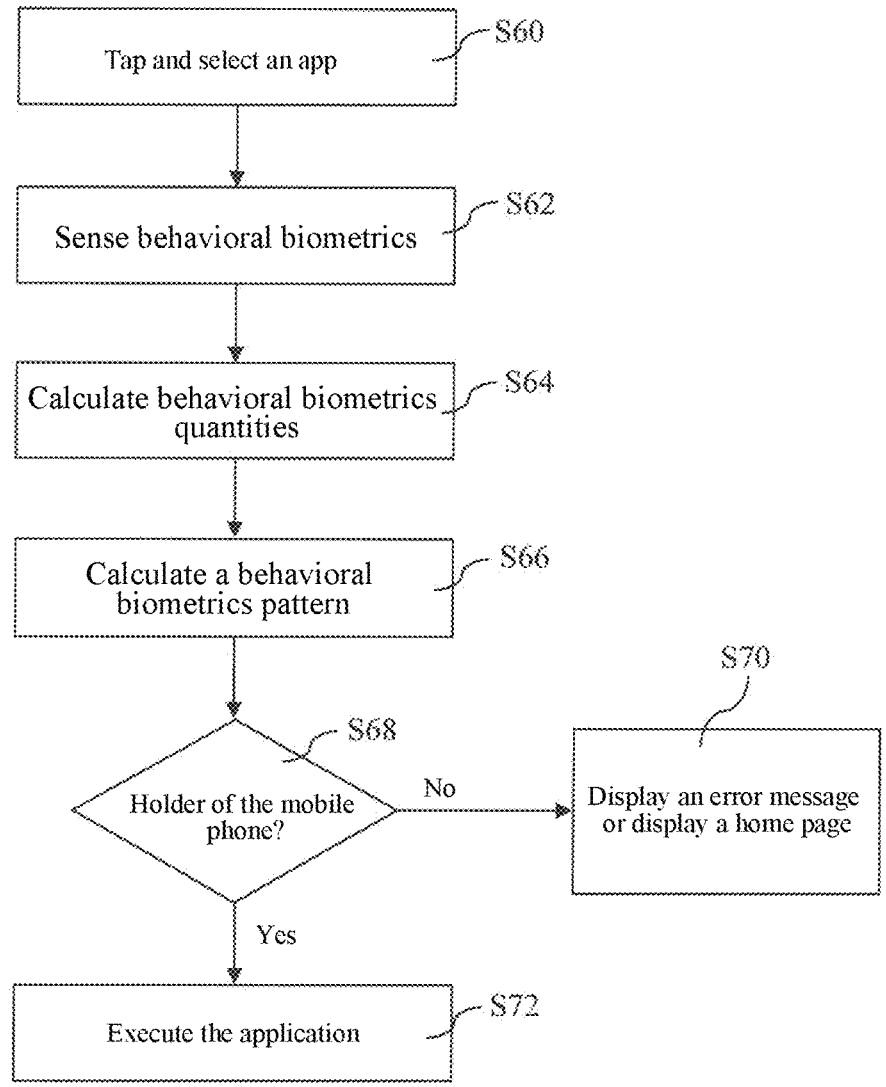
FIG. 5 is a flowchart of operations for authenticating a user of a smart phone according to the present invention.

FIG. 5 is a flowchart of operations for authenticating a user of a smart phone according to the present invention. During the description of procedures and steps in FIG. 5, reference may be made to FIG. 1 to FIG. 4.

A smart phone 10 includes an orientation sensor 12, a touch screen sensor 14, and a touch screen 22, and an authentication module 16 includes a behavioral biometrics conversion element 18 and an authentication mechanism core element 20. The authentication module 16 may be built in an operating system or an application (app) of the smart phone 10.

In another embodiment, the authentication module 16 may be built in a server (not shown). When the authentication module 16 is built in a server, several magnetic-axis azimuth angles, pitch angles, left-right roll angles, and timestamps sensed by the orientation sensor 12 and several screen touch positions, screen touch areas, force values, and timestamps sensed by the touch screen sensor 14 are transferred to the behavioral biometrics conversion element 18 through a network, and a result of classification and determination by the authentication mechanism core element 20 is transferred to the smart phone 10 through the network.

The smart phone 10 is used to sense behavioral biometrics of a user, so as to monitor a behavior of a user in real time. The behavioral biometrics conversion element 18 and the authentication mechanism core element 20 are implemented on a remote server, and provide operation service through the efficacy of remote server hardware.

In the embodiment of FIG. 5, a case where an operation mechanism and a module for authenticating a user of a smart phone are embedded in an app of Facebook is used as an example, and a user of the smart phone 10 taps and selects a pattern of Facebook on an application page on the touch screen 22. When the user taps and selects the pattern of Facebook, the smart phone 10 starts the operation mechanism and the module for authenticating a user of a smart phone (Step S60).

When a user slides once on the touch screen 22, the smart phone 10 generates a set of numerical values such as several magnetic-axis azimuth angles, pitch angles, left-right roll angles, and timestamps sensed by the orientation sensor 12 and several screen touch positions, screen touch areas, force values, and timestamps sensed by the touch screen sensor 14 (Step S62).

After the orientation sensor 12 and the touch screen sensor 14 transfer a set of the numerical values to the behavioral biometrics conversion element 18, the behavioral biometrics conversion element 18 performs the foregoing calculation on a set of numerical values of three axes (that is, a magnetic-axis azimuth angle, a pitch angle, and a left-right roll angle) of the smart phone 10 to obtain 33 behavioral biometrics quantities, of a range of a variation of an absolute angle or a relative angle, a range of a variation of an average value, and a range of a variation of a standard deviation, that are separately based on a variation of an angle, a variation of an angular velocity, and a variation of an angular acceleration. The behavioral biometrics conversion element 18 performs the foregoing calculation on a set of numerical values such as a touch trajectory, an action (velocity and acceleration) of the touch trajectory, and specific characteristics (a touch area and a pressure) of the touch on the touch screen 22 to obtain 16 behavioral biometrics quantities (Step S64).

When the user slides on the touch screen multiple times, multiple sets of numerical values such as several magnetic-axis azimuth angles, pitch angles, left-right roll angles, and timestamps sensed by the orientation sensor 12 and several screen touch positions, screen touch areas, force values, and timestamps sensed by the touch screen sensor 14 are transferred to the behavioral biometrics conversion element 18. The behavioral biometrics conversion element 18 performs the foregoing calculation to obtain multiple sets of 33 behavioral biometrics quantities of the holding behavioral biometrics and 16 behavioral biometrics quantities of the operating behavioral biometrics. The behavioral biometrics conversion element 18 performs biometric quantization and conversion of a histogram on the multiple sets of behavioral biometrics quantities, that is, statistically establishes a behavioral biometrics pattern corresponding to each behavioral biometrics quantity in a histogram. For example, FIG. 4 shows a behavioral biometrics pattern of positions of operating trajectories in behavioral biometrics quantities in a histogram (Step S66).

The behavioral biometrics conversion element 18 transfers the multiple sets of behavioral biometrics patterns corresponding to each behavioral biometrics quantity to the authentication mechanism core element 20. The authentication mechanism core element 20 uses the foregoing classifier algorithm to perform classification and determination on the behavioral biometrics pattern according to a behavioral biometrics model pattern on a histogram, so as to determine whether the user of the smart phone 10 is the holder of the smart phone 10 (Step S68).

The establishment of a behavioral biometrics model pattern (similar to the pattern on the histogram in FIG. 4) of a corresponding holder of the smart phone 10 is to statistically construct several behavioral biometrics model patterns corresponding to each behavioral biometrics quantity on a histogram by using more sets of 33 behavioral biometrics quantities of the holding behavioral biometrics and 16 behavioral biometrics quantities of the operating behavioral biometrics. If a behavioral biometrics model pattern is established from more sets of 33 behavioral biometrics quantities of the holding behavioral biometrics and 16 behavioral biometrics quantities of the operating behavioral biometrics, a result generated by the authentication mechanism core element 20 through classification and determination performed on the behavioral biometrics model pattern and the behavioral biometrics pattern is more accurate.

If the result of the classification and determination performed by the authentication mechanism core element 20 on the behavioral biometrics model pattern and the behavioral biometrics pattern is false, that is, the behavioral biometrics model pattern does not conform to the behavioral biometrics pattern, which represents that the user who operates the smart phone 10 is not the holder of the smart phone 10, the authentication mechanism core element 20 sends an error signal to the smart phone 10, so that the smart phone 10 displays an error message on the touch screen 22 or displays a home page to stop the user from operating programs such as the Facebook app (Step S70). If the result of the classification and determination performed by the authentication mechanism core element 20 on the behavioral biometrics model pattern and the behavioral biometrics pattern is true, that is, the behavioral biometrics model pattern conforms to the behavioral biometrics pattern, which represents that the user who operates the smart phone 10 is the holder of the smart phone 10, the authentication mechanism core element 20 sends a correct signal to the smart phone 10, so that the user may keep operating the Facebook app (Step S72).

In another embodiment, when the behavioral biometrics conversion element 18 and the authentication mechanism core element 20 are built in the server (not shown), in Step S64, the orientation sensor 12 and the touch screen sensor 14 transfer the foregoing sensed numerical values through the network to the behavioral biometrics conversion element 18, in Step S70 and Step S72, the authentication mechanism core element 20 sends an error signal or a correct signal to the smart phone 10, and procedures and steps that are not elaborated are the same as the procedures and steps in the foregoing embodiment, description of which is omitted herein.

The foregoing method for authenticating a user of a smart phone in the present invention may be implemented by a computer program product, and after a smart phone downloads the computer program product from, for example, the network and executes the computer program product, steps of the method in the foregoing description and drawings may be implemented.

The present invention provides a method, a module, and a computer program product for authenticating a user of a mobile device. An orientation sensor and a touch screen sensor that are built in a smart phone are used to collect, when a user operates the smart phone, behavioral biometrics about holding of and operations on the smart phone of the user to perform authentication, so as to form a new generation protection mechanism for a smart phone and provide stronger protection for a smart phone.

Although the present invention is described above with reference to preferred embodiments and exemplary drawings, the present invention should not be limited thereto. Various modifications, omissions, and variations made by a person skilled in the art do not depart from the scope of the present invention.

What is claimed is:

1. A server including a module for authenticating a user of a mobile device, wherein the mobile device has an orientation sensor and a touch screen sensor, and the module comprises:
   a behavioral biometrics conversion element, used to perform calculation by matching timestamps with a plurality of behavioral data of operations, sensed by the orientation sensor and the touch screen sensor, on the mobile device to acquire a plurality of behavioral biometrics quantities, and convert, by using a statistical method, multiple sets of the behavioral biometrics quantities into a behavioral biometrics pattern in a histogram constructing manner; and
   an authentication mechanism core element, used to determine whether the behavioral biometrics pattern conforms to a behavioral biometrics model pattern in a histogram manner.

2. The server according to claim 1, wherein the behavioral biometrics conversion element performs calculation by matching timestamps with a plurality of behavioral data of operations, by a holder of the mobile device, on the mobile device to acquire a plurality of behavioral biometrics quantities of the holder of the mobile device, and performs statistics on multiple sets of the behavioral biometrics quantities to obtain the behavioral biometrics model pattern in a histogram manner.

3. The server according to claim 1, wherein the behavioral data comprises:
   at least one of a magnetic-axis azimuth angle, a front-rear roll angle, and a left-right roll angle sensed by the orientation sensor; and
   at least one of a screen touch position, a screen touch area, and a force value, that are sensed by the touch screen sensor sensed by the touch screen sensor.

4. The server according to claim 1, wherein the behavioral biometrics quantities comprise:
   at least one of the following biometrics quantities converted from the behavioral data sensed by the orientation sensor:
   a distribution proportion range of variations of a front-rear roll angle,
   a distribution proportion range of variations of a left-right roll angle,
   a distribution proportion range of variations of a compound angle of a front-rear roll angle and a left-right roll angle;
   a distribution proportion range of variations of an angular velocity of a front-rear roll angle,
   a distribution proportion range of variations of an angular velocity of a left-right roll angle,
   a distribution proportion range of variations of an angular velocity of a compound angle of a front-rear roll angle and a left-right roll angle,
   a distribution proportion range of variations of an angular velocity of an magnetic-axis azimuth angle;
   a distribution proportion range of variations of an angular acceleration of a front-rear roll angle,
   a distribution proportion range of variations of an angular acceleration of a left-right roll angle,
   a distribution proportion range of variations of an angular acceleration of a compound angle of a front-rear roll angle and a left-right roll angle,
   a distribution proportion range of variations of an angular acceleration of a magnetic-axis azimuth angle;
   a distribution proportion range of an average value of variations of a front-rear roll angle,
   a distribution proportion range of an average value of variations of a left-right roll angle,
   a distribution proportion range of an average value of variations of a compound angle of a front-rear roll angle and a left-right roll angle;
   a distribution proportion range of an average value of variations of an angular velocity of a front-rear roll angle,
   a distribution proportion range of an average value of variations of an angular velocity of a left-right roll angle,
   a distribution proportion range of an average value of variations of an angular velocity of a compound angle of a front-rear roll angle and a left-right roll angle,
   a distribution proportion range of an average value of variations of an angular velocity of a magnetic-axis azimuth angle;
   a distribution proportion range of an average value of variations of an angular acceleration of a front-rear roll angle,
   a distribution proportion range of an average value of variations of an angular acceleration of a left-right roll angle,
   a distribution proportion range of an average value of variations of an angular acceleration of a compound angle of a front-rear roll angle and a left-right roll angle,
   a distribution proportion range of an average value of variations of an angular acceleration of a magnetic-axis azimuth angle;
   a distribution proportion range of a standard deviation of variations of a front-rear roll angle, a distribution proportion range of a standard deviation of variations of a left-right roll angle, a distribution proportion range of a standard deviation of variations of a compound angle of a front-rear roll angle and a left-right roll angle;

a distribution proportion range of a standard deviation of variations of an angular velocity of a front-rear roll angle, a distribution proportion range of a standard deviation of variations of an angular velocity of a left-right roll angle, a distribution proportion range of a standard deviation of variations of an angular velocity of a compound angle of a front-rear roll angle and a left-right roll angle, a distribution proportion range of a standard deviation of variations of an angular velocity of a magnetic-axis azimuth angle;

a distribution proportion range of a standard deviation of variations of an angular acceleration of a front-rear roll angle, a distribution proportion range of a standard deviation of variations of an angular acceleration of a left-right roll angle, a distribution proportion range of a standard deviation of variations of an angular acceleration of a compound angle of a front-rear roll angle and a left-right roll angle, and a distribution proportion range of a standard deviation of variations of an angular acceleration of a magnetic-axis azimuth angle; and at least one of the following biometrics quantities converted from the behavioral data sensed by the touch screen sensor:

an X-axis absolute coordinate of a start position of an operating trajectory, a Y-axis absolute coordinate of a start position of an operating trajectory, an X-axis absolute coordinate of an end position of an operating trajectory, a Y-axis absolute coordinate of an end position of an operating trajectory, a position labeled and quantized through picture segmentation on an operating trajectory, a straight line distance between a start position and an end position of an operating trajectory, a distance in an X-axis direction between a start position and an end position of an operating trajectory, a distance in a Y-axis direction between a start position and an end position of an operating trajectory, a path length of an operating trajectory, a variation of a tangent angle on an operating trajectory, a variation of a curvature on an operating trajectory, a variation of a period of time taken for an operating trajectory, a variation of a velocity on an operating trajectory, a variation of an acceleration on an operating trajectory, a screen touch area on an operating trajectory, and a force value on an operating trajectory.

5. The server according to claim 1, wherein the authentication mechanism core element classifies the behavioral biometrics pattern according to the behavioral biometrics model pattern by using a classifier algorithm, so as to determine whether the behavioral biometrics pattern conforms to the behavioral biometrics model pattern.

6. The server according to claim 5, wherein the classifier algorithm is a weighted k-nearest-neighbor (W-KNN) algorithm, a support vector machine (SVM) algorithm, an artificial neural network (Multi-Layer Perceptron, MLP) algorithm, a Bayes algorithm or a decision tree algorithm.

7. The server according to claim 1, wherein the mobile device is a smart phone.

8. The server according to claim 1, wherein the module is built in the mobile device.

9. The server according to any one of claims 1 to 7, which is used to authenticate a user of the mobile device at a remote end.

10. A method for authenticating a user of a mobile device, wherein the mobile device has an orientation sensor and a touch screen sensor, and the method comprises the following steps:

sensing, by the orientation sensor and the touch screen sensor, operations on the mobile device to acquire a plurality of behavioral data;

performing, by a behavioral biometrics conversion unit, calculation by matching the behavioral data with timestamps to acquire a plurality of behavioral biometrics quantities;

converting, by the behavioral biometrics conversion unit by using a statistical method, multiple sets of the behavioral biometrics quantities into a behavioral biometrics pattern in a histogram constructing manner; and determining, by an authentication mechanism core element, whether the behavioral biometrics pattern conforms to a behavioral biometrics model pattern in a histogram manner.

11. The method according to claim 10, wherein the behavioral biometrics conversion element performs calculation by matching timestamps with a plurality of behavioral data of operations, by a holder of the mobile device, on the mobile device to acquire a plurality of behavioral biometrics quantities of the holder of the mobile device, and performs statistics on multiple sets of the behavioral biometrics quantities to obtain the behavioral biometrics pattern in a histogram manner.

12. The method according to claim 10 or 11, wherein the behavioral data comprises:

at least one of a magnetic-axis azimuth angle, a front-rear roll angle, and a left-right roll angle sensed by the orientation sensor; and at least one of a screen touch position, a screen touch area, and a force value, that are sensed by the touch screen sensor.

13. The method according to claim 10 or 11, wherein the behavioral biometrics quantities comprise:

at least one of the following biometrics quantities converted from the behavioral data sensed by the orientation sensor:

a distribution proportion range of variations of a front-rear roll angle, a distribution proportion range of variations of a left-right roll angle, a distribution proportion range of variations of a compound angle of a front-rear roll angle and a left-right roll angle;

a distribution proportion range of variations of an angular velocity of a front-rear roll angle, a distribution proportion range of variations of an angular velocity of a left-right roll angle, a distribution proportion range of variations of an angular velocity of a compound angle of a front-rear roll angle and a left-right roll angle, a distribution proportion range of variations of an angular velocity of an magnetic-axis azimuth angle;

a distribution proportion range of variations of an angular acceleration of a front-rear roll angle, a distribution proportion range of variations of an angular acceleration of a left-right roll angle,
a distribution proportion range of variations of an angular acceleration of a compound angle of a front-rear roll angle and a left-right roll angle,
a distribution proportion range of variations of an angular acceleration of a magnetic-axis azimuth angle;
a distribution proportion range of an average value of variations of a front-rear roll angle,
a distribution proportion range of an average value of variations of a left-right roll angle,
a distribution proportion range of an average value of variations of a compound angle of a front-rear roll angle and a left-right roll angle;
a distribution proportion range of an average value of variations of an angular velocity of a front-rear roll angle,
a distribution proportion range of an average value of variations of an angular velocity of a left-right roll angle,
a distribution proportion range of an average value of variations of an angular velocity of a compound angle of a front-rear roll angle and a left-right roll angle,
a distribution proportion range of an average value of variations of an angular velocity of a magnetic-axis azimuth angle;
a distribution proportion range of an average value of variations of an angular acceleration of a front-rear roll angle,
a distribution proportion range of an average value of variations of an angular acceleration of a left-right roll angle,
a distribution proportion range of an average value of variations of an angular acceleration of a compound angle of a front-rear roll angle and a left-right roll angle,
a distribution proportion range of an average value of variations of an angular acceleration of a magnetic-axis azimuth angle;
a distribution proportion range of a standard deviation of variations of a front-rear roll angle,
a distribution proportion range of a standard deviation of variations of a left-right roll angle,
a distribution proportion range of a standard deviation of variations of a compound angle of a front-rear roll angle and a left-right roll angle;
a distribution proportion range of a standard deviation of variations of an angular velocity of a front-rear roll angle,
a distribution proportion range of a standard deviation of variations of an angular velocity of a left-right roll angle,
a distribution proportion range of a standard deviation of variations of an angular velocity of a compound angle of a front-rear roll angle and a left-right roll angle,
a distribution proportion range of a standard deviation of variations of an angular velocity of a magnetic-axis azimuth angle;
a distribution proportion range of a standard deviation of variations of an angular acceleration of a front-rear roll angle,
a distribution proportion range of a standard deviation of variations of an angular acceleration of a left-right roll angle,
a distribution proportion range of a standard deviation of variations of an angular acceleration of a compound angle of a front-rear roll angle and a left-right roll angle,
a distribution proportion range of a standard deviation of variations of an angular acceleration of a magnetic-axis azimuth angle; and
at least one of the following biometrics quantities converted from the behavioral data sensed by the touch screen sensor:
an X-axis absolute coordinate of a start position of an operating trajectory,
a Y-axis absolute coordinate of a start position of an operating trajectory,
an X-axis absolute coordinate of an end position of an operating trajectory,
a Y-axis absolute coordinate of an end position of an operating trajectory,
a position labeled and quantized through picture segmentation on an operating trajectory,
a straight line distance between a start position and an end position of an operating trajectory,
a distance in an X-axis direction between a start position and an end position of an operating trajectory,
a distance in a Y-axis direction between a start position and an end position of an operating trajectory,
a path length of an operating trajectory,
a variation of a tangent angle on an operating trajectory,
a variation of a curvature on an operating trajectory,
a variation of a period of time taken for an operating trajectory,
a variation of a velocity on an operating trajectory,
a variation of an acceleration on an operating trajectory,
a screen touch area on an operating trajectory,
a force value on an operating trajectory.

14. The method according to claim 10, wherein the authentication mechanism core element classifies the behavioral biometrics pattern according to the behavioral biometrics model pattern by using a classifier algorithm, so as to determine whether the behavioral biometrics pattern conforms to the behavioral biometrics model pattern.

15. The method according to claim 14, wherein the classifier algorithm is a weighted k-nearest-neighbor (W-KNN) algorithm, a support vector machine (SVM) algorithm, an artificial neural network (Multi-Layer Perceptron, MLP) algorithm, a Bayes algorithm or a decision tree algorithm.

* * * * *